US012601292B1

(12) United States Patent
Ruga et al.

(10) Patent No.: US 12,601,292 B1
(45) Date of Patent: Apr. 14, 2026

(54) SYSTEMS AND METHODS FOR STEAM SUPPLY TO GAS CAPTURE SYSTEM DURING SHUTDOWN

(71) Applicant: GE Infrastructure Technology LLC, Greenville, SC (US)

(72) Inventors: Cristian Ruga, Baden (CH); Hongtao Li, Baden (CH)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/067,147

(22) Filed: Feb. 28, 2025

(51) Int. Cl.
*F02C 6/18* (2006.01)
*F01K 23/10* (2006.01)

(52) U.S. Cl.
CPC ............... *F02C 6/18* (2013.01); *F01K 23/10* (2013.01)

(58) Field of Classification Search
CPC . F02C 6/18; F01K 23/10; F01K 13/02; F01K 19/00; F01D 21/00; F05D 2260/61; F05D 2260/611; Y02E 20/18
See application file for complete search history.

(56) References Cited

U.S. PATENT DOCUMENTS

2017/0268425 A1* 9/2017 Gulen ...................... F01K 3/20

\* cited by examiner

*Primary Examiner* — William H Rodriguez
(74) *Attorney, Agent, or Firm* — Fletcher Yoder, P.C.

(57) ABSTRACT

A system may include a gas capture system comprising a separation material, wherein the gas capture system is configured to operate a regeneration process during a part load operation and/or a shutdown operation to desorb undesirable gas from the separation material to regenerate the separation material for an absorption process, a heat recovery steam generator (HSRG) configured to receive exhaust gas and generate steam, and a backup line fluidly coupling the gas capture system to the HRSG, wherein the backup line is configured to provide the steam from the HRSG to the gas capture system for the regeneration process during the part load operation and/or the shutdown operation.

22 Claims, 4 Drawing Sheets

200

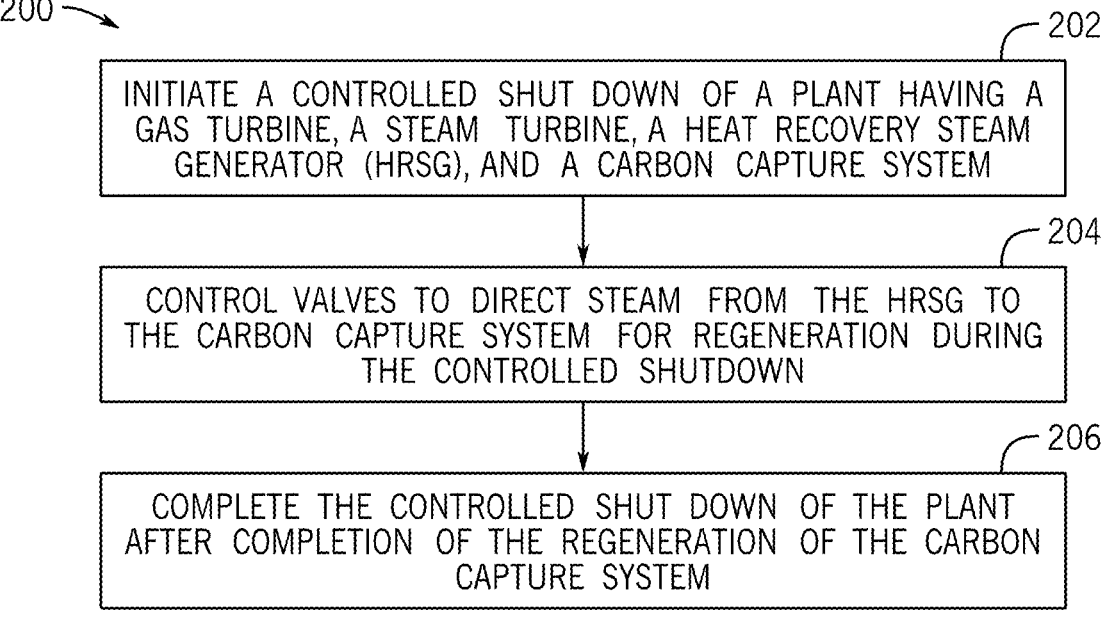

202

INITIATE A CONTROLLED SHUT DOWN OF A PLANT HAVING A GAS TURBINE, A STEAM TURBINE, A HEAT RECOVERY STEAM GENERATOR (HRSG), AND A CARBON CAPTURE SYSTEM

204

CONTROL VALVES TO DIRECT STEAM FROM THE HRSG TO THE CARBON CAPTURE SYSTEM FOR REGENERATION DURING THE CONTROLLED SHUTDOWN

206

COMPLETE THE CONTROLLED SHUT DOWN OF THE PLANT AFTER COMPLETION OF THE REGENERATION OF THE CARBON CAPTURE SYSTEM

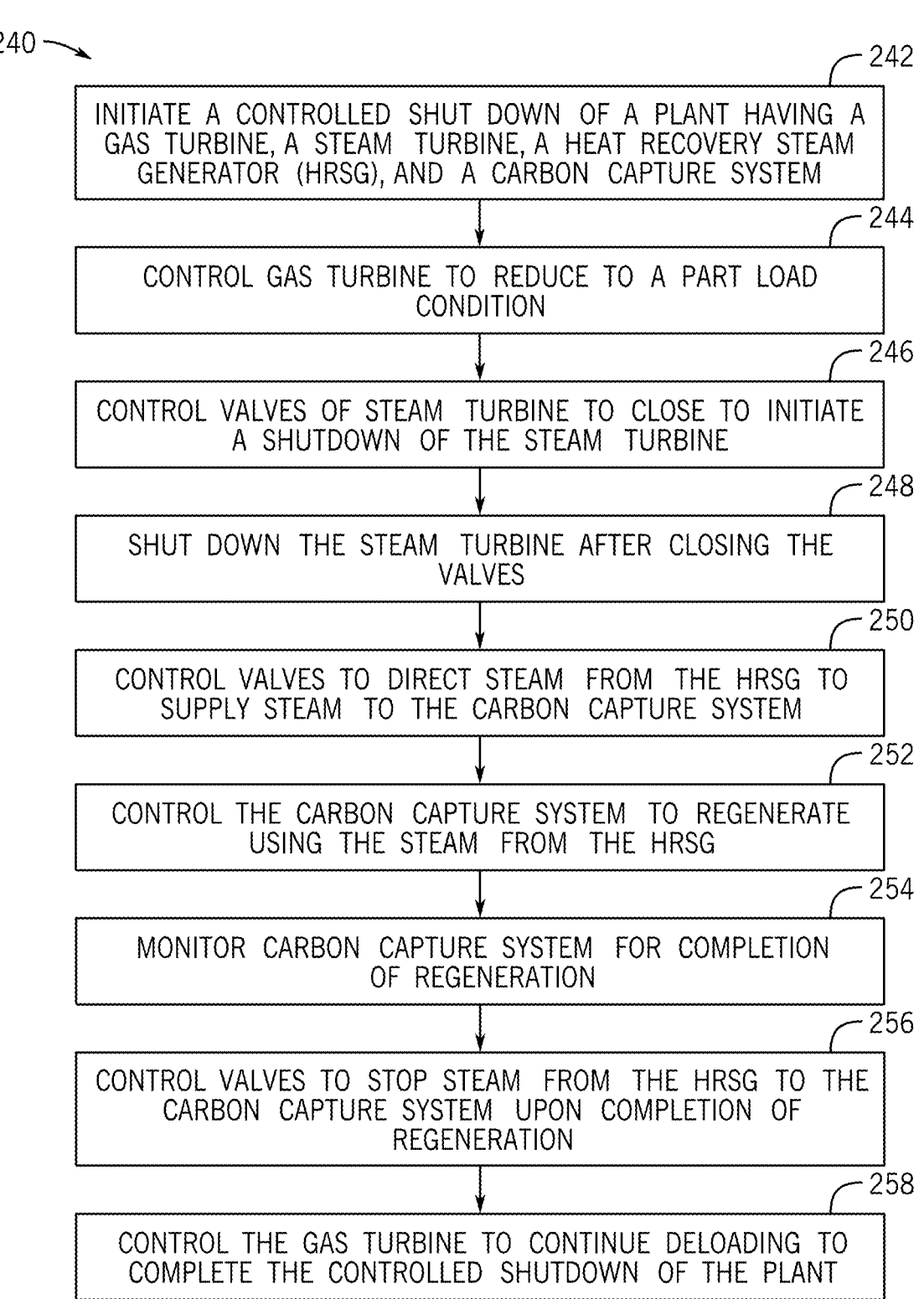

242
INITIATE A CONTROLLED SHUT DOWN OF A PLANT HAVING A GAS TURBINE, A STEAM TURBINE, A HEAT RECOVERY STEAM GENERATOR (HRSG), AND A CARBON CAPTURE SYSTEM

244
CONTROL GAS TURBINE TO REDUCE TO A PART LOAD CONDITION

246
CONTROL VALVES OF STEAM TURBINE TO CLOSE TO INITIATE A SHUTDOWN OF THE STEAM TURBINE

248
SHUT DOWN THE STEAM TURBINE AFTER CLOSING THE VALVES

250
CONTROL VALVES TO DIRECT STEAM FROM THE HRSG TO SUPPLY STEAM TO THE CARBON CAPTURE SYSTEM

252
CONTROL THE CARBON CAPTURE SYSTEM TO REGENERATE USING THE STEAM FROM THE HRSG

254
MONITOR CARBON CAPTURE SYSTEM FOR COMPLETION OF REGENERATION

256
CONTROL VALVES TO STOP STEAM FROM THE HRSG TO THE CARBON CAPTURE SYSTEM UPON COMPLETION OF REGENERATION

258
CONTROL THE GAS TURBINE TO CONTINUE DELOADING TO COMPLETE THE CONTROLLED SHUTDOWN OF THE PLANT

FIG. 4

SYSTEMS AND METHODS FOR STEAM SUPPLY TO GAS CAPTURE SYSTEM DURING SHUTDOWN

BACKGROUND

The present application relates generally to a system and method for steam supply to a gas capture system during a controlled shutdown operation of a combustion system, such as a combustion-driven power plant.

An industrial plant, such as a combustion-driven power plant, may produce a variety of gases, such as an exhaust gas of a combustion system. The combustion system may include a gas turbine engine, a reciprocating piston-cylinder engine, a furnace, a boiler (e.g., heat recovery steam generator (HRSG)), a steam turbine, or other industrial equipment. These exhaust gases may include one or more undesirable gases, such as acid gases and/or greenhouse gases. For example, the undesirable gases may include carbon oxides ($CO_x$) such as carbon dioxide ($CO_2$) and carbon monoxide ($CO$), nitrogen oxides ($NO_x$) such as nitrogen dioxide ($NO_2$), and/or sulfur oxides ($SO_x$) such as sulfur dioxide ($SO_2$). In certain instances, the combustion-driven power plant may include gas capture systems that enable gas capture of the undesirable gases during operation of the combustion-driven power plant. The gas capture systems may perform regeneration operations to remove (e.g., strip, desorb) the undesirable gases from separation materials (e.g., sorbent materials of adsorbers and/or solvents of strippers), such as by applying heat to the separation materials. Unfortunately, during a shutdown operation of the combustion-driven power plant, the regeneration of the separation materials is generally incomplete due to the lack of heat. As a result, during a subsequent startup operation of the combustion-driven power plant, the previously incomplete regeneration of the separation materials results in a reduced gas capture rate in the gas capture system. Accordingly, a need exists to improve the regeneration during the shutdown operations, such as by providing additional heat to complete the regeneration.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a system may include a gas capture system comprising a separation material, wherein the gas capture plant is configured to operate a regeneration process during a part load operation and/or a shutdown operation to desorb undesirable gas from the separation material to regenerate the separation material for an absorption process, a heat recovery steam generator (HSRG) configured to receive exhaust gas and generate steam, and a backup line fluidly coupling the gas capture system to the HRSG, wherein the backup line is configured to provide the steam from the HRSG to the gas capture system for the regeneration process during the part load operation and/or the shutdown operation.

In another embodiment, a system may include a plant including a gas turbine configured to output an exhaust gas, a heat recovery steam generator (HRSG) configured to receive the exhaust gas and output steam, and a steam turbine configured to receive the steam. The system may also include a carbon capture system configured to capture an undesirable gas from the exhaust gas in a separation material and a controller configured to initiate a part load operation and/or a shutdown operation of the plant. The controller may control the gas turbine to reduce to a part load condition and continue to output the exhaust gas, control a first set of valves to at least partially close to reduce or disable flow of the steam to the steam turbine, and control a second set of valves to enable or increase flow of the steam from the HRSG to the carbon capture system via a backup line for a period of time to perform a regeneration process on the separation material.

Still in another embodiment, a method may include initiating a shutdown operation or a part load operation of a plant having a gas turbine, a steam turbine, a heat recovery steam generator (HRSG), and a carbon capture system having a separation material, controlling the gas turbine to reduce to a part load condition, controlling a first set of valves to at least partially close to reduce or disable flow of a steam to the steam turbine, and controlling a second set of valves coupled to a backup line to enable or increase flow of the steam from the HRSG to the carbon capture system to perform a regeneration process on the separation material.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a flowchart of an example method for shutting down the combined cycle system of FIG. 1.

FIG. 4 is a flowchart of an example method for shutting down the combined cycle system of FIG. 1.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods for improving carbon capture rate of combustion systems, such as combustion-drive power plants and/or combined cycle power plants having one or more gas capture systems. The gas capture systems are configured to remove undesirable gases (e.g., carbon dioxide ($CO_2$)) from the exhaust gas of the combustion system. In the disclosed embodiments, the combustion system includes a backup line configured to provide heated water and/or steam from a heat recovery steam generator (HRSG) to the gas capture systems during a shutdown operation of the combustion system. As such, the gas capture systems may perform regeneration operations during the shutdown operation and increase an amount of available separation materials for subsequent combustion operations, which may improve the carbon capture rate during a subsequent startup operation.

Figure 1:
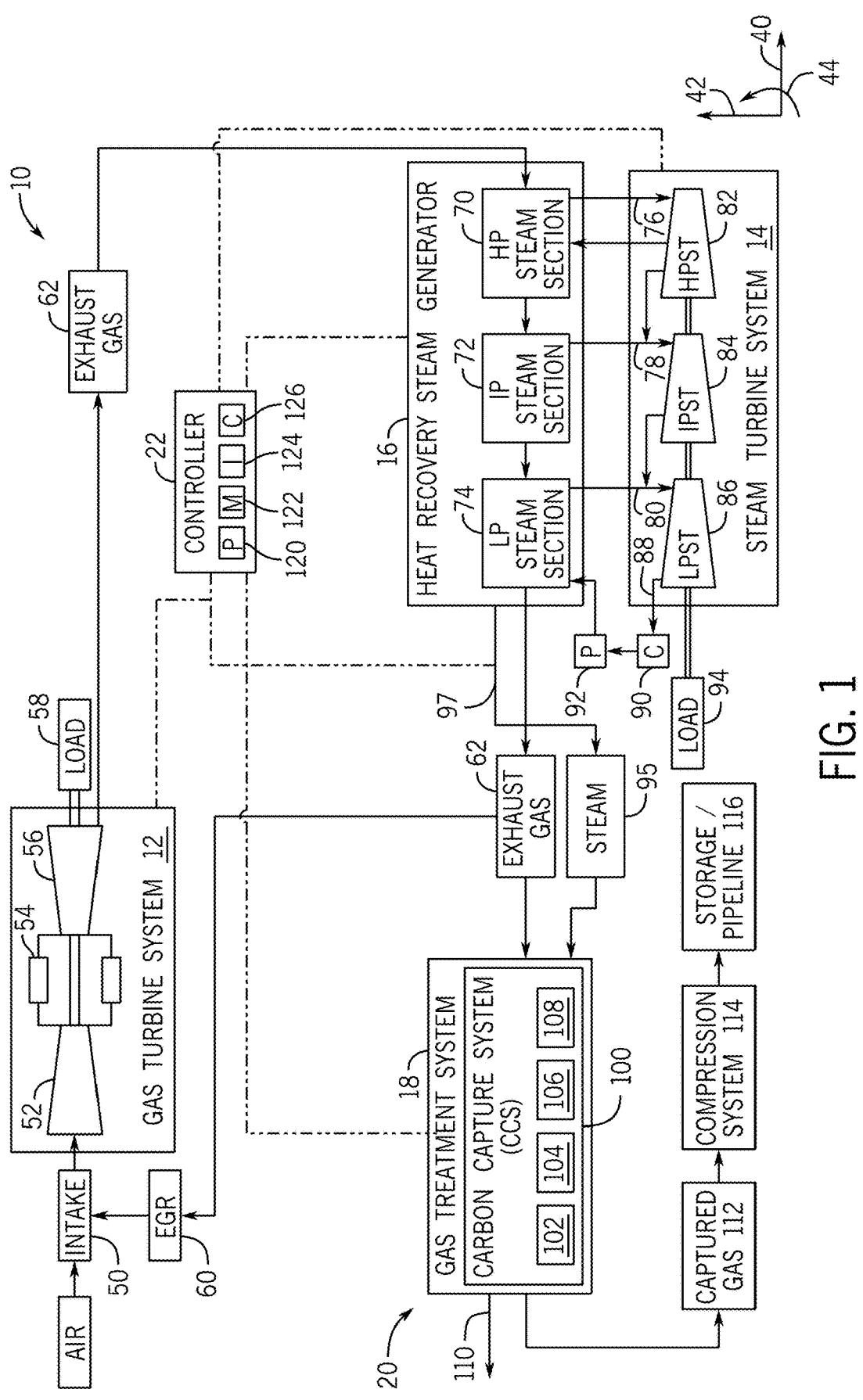
FIG. 1 is a block diagram of an embodiment of a combined cycle system having one or more gas capture systems.

FIG. 1 is a block diagram of an embodiment of a combined cycle system 10 having a gas turbine system 12, a steam turbine system 14, a heat recovery steam generator (HRSG) 16, a gas treatment system 18 having one or more gas capture systems 20, and a controller 22 coupled to each of the systems 12, 14, 16, and 18. As discussed below, the one or more gas capture systems 20 of the gas treatment system 18 are configured to capture an undesirable gas (e.g., $CO_2$) from exhaust gas and/or air (e.g., direct air capture), wherein heat (e.g., steam) is used for a desorption mode during both a normal operation and a shutdown operation of the combined cycle system 10. In certain embodiments, during the shutdown operation, the combined cycle system 10 is configured to supply heat (e.g., steam) to the gas treatment system 18 (e.g., gas capture systems 20) until the separation materials (e.g., sorbent materials of adsorbers and/or solvents of strippers) are substantially free of the undesirable gas (e.g., $CO_2$) to complete a regeneration of the separation materials. For example, during the shutdown operation, the gas turbine system 12 may initiate a shutdown procedure to transition from a full load condition to a part load condition, the steam turbine system 14 may initiate a shutdown procedure to close main valves to stop steam supply to the steam turbines and open bypass valves to bypass the steam turbines, and the steam produced by the HRSG 16 is supplied to the gas treatment system 18 (e.g., gas capture systems 20) to complete the regeneration of the separation materials. Upon completion of the regeneration, the combined cycle system 10 may then continue and complete the shutdown procedure of the gas turbine system 12. In other words, during a part load condition of the gas turbine system 12, the regeneration of the separation materials is achieved using the steam from the HRSG 16, thereby preparing the gas capture systems 20 for a subsequent startup operation.

Before discussing the details of the gas treatment system 18, various aspects of the combined cycle system 10 are discussed in further detail. For purposes of orientation in the drawings, reference may be made to an axial direction or axis 40, a radial direction or axis 42 extending radially away from the axial direction or axis 40, and a circumferential direction or axis 44 extending circumferentially around the axial direction or axis 40. The directions or axes 40, 42, and 44 may be in reference to a rotational axis 36 of the gas turbine system 12, for example.

The gas turbine system 12 includes an air intake 50, a compressor 52 having one or more compressor stages, one or more combustors 54, a turbine 56 having one or more turbine stages, and a load 58 (e.g., electrical generator)

driven by the turbine 56. In certain embodiments, the gas turbine system 12 further includes an exhaust gas recirculation (EGR) system 60 configured to recirculate an exhaust gas 62 into the air intake 50. The recirculated exhaust gas 62 helps to reduce the temperature and formation of certain emissions (e.g., nitrogen oxides ($NO_X$)) associated with combustion in the combustors 54. In operation, the compressor 52 receives air (and also exhaust gas 62 if the EGR system 60 is active) from the air intake 50, and compresses the air and/or exhaust gas 62 in one or more compressor stages (e.g., stages of rotating compressor blades). The combustors 54 then combust fuel from a fuel supply system with the compressed air and/or exhaust gas and generate hot combustion gases. The hot combustion gases expand and drive one or more turbine stages (e.g., stages of rotating turbine blades) in the turbine 56, thereby driving rotation of the compressor 52 and the load 58 via shafts. The turbine 56 then outputs the hot combustion gases as the exhaust gas 62.

The HRSG 16 recovers waste heat from the exhaust gas 62 to generate steam for driving the steam turbine system 14. The HRSG 16 includes a high-pressure (HP) steam section 70, an intermediate-steam (IP) section 72, and a low-pressure (LP) steam section 74 configured to generate HP steam 76, IP steam 78, and LP steam 80. The steam turbine system 14 may include an HP steam turbine 82 driven by the HP steam 76, an IP steam turbine 84 driven by the IP steam 78, and a LP steam turbine 86 driven by the LP steam 80. In addition to the steam provided by the HRSG 16, the HP steam turbine 82 provides IP steam to the IP steam turbine 84, and the IP steam turbine 84 provides LP steam to the LP steam turbine 86. The LP steam turbine 86 then outputs any remaining steam/water to a condensate line 88 coupled to the LP steam section 74 of the HRSG 16. The condensate line 88 may include a condenser 90 configured to condense any remaining steam to form a condensate, and a pump 92 configured to pump the condensate back to the LP steam section 74. In operation, the steam turbine system 14 drives a load 94 (e.g., electrical generator) via a shaft. In certain embodiments, the steam turbine system 14 and/or the HRSG 16 may provide heated water and/or steam (e.g., HP steam 76, IP steam 78, and/or LP steam 80) to the gas treatment system 18 to support a desorption mode (e.g., regeneration operations) of the one or more gas capture systems 20. In another example, the gas capture systems 20 may receive heated water and/or steam in a temperature range of 100 to 150 degrees Celsius, 110 to 150 degrees Celsius, 120 to 150 degrees Celsius, or 130 to 150 degrees Celsius.

After the HRSG 16, the exhaust gas 62 may flow to the EGR system 60 and/or the gas treatment system 18. In the illustrated embodiment, the exhaust gas 62 flows through one or more gas capture systems 20 configured to capture undesirable gases. The undesirable gases may include carbon oxides ($CO_X$) (e.g., carbon dioxide ($CO_2$) and carbon monoxide (CO)), nitrogen oxides ($NO_X$) (e.g., nitrogen dioxide ($NO_2$)), sulfur oxides ($SO_X$) (e.g., sulfur dioxide ($SO_2$)), or any combination thereof. In the following discussion, $CO_2$ may be used as an example of the undesirable gases; however, the gas capture systems 20 may be designed to capture any of the foregoing undesirable gases. For example, the gas capture systems 20 include one or more carbon capture systems 100 (e.g., $CO_2$ capture systems). The gas capture systems 20 (e.g., carbon capture systems 100) may include sorbent-based gas capture systems, solvent-based gas capture systems, cryogenic gas capture systems, or any combination thereof, configured to remove and capture undesirable gases. The carbon capture system 100 may include components 102, 104, 106, and 108 configured to enable gas capture of undesirable gases (e.g., $CO_2$) from the exhaust gas 62, thereby outputting a treated gas 110 and a captured gas 112 (e.g., $CO_2$). The treated gas 110 may be substantially free of the undesirable gases (e.g., $CO_2$) and may be discharged through an exhaust stack. The captured gas 112 (e.g., $CO_2$) may be compressed by a compression system 114 and stored and/or transported by a storage and/or pipeline system 116.

In certain embodiments, the carbon capture system 100 is a sorbent-based carbon capture system, and the components 102, 104, 106, and/or 108 include multiple sorbent-based carbon capture units (e.g., adsorbers). For example, the sorbent-based carbon capture units may include temperature swing adsorption (TSA) units or adsorbers, wherein a temperature swing or change is used to sequentially operate in an adsorption mode, a desorption mode, and a cooling mode at different temperatures. In the adsorption mode, the adsorber is configured to adsorb undesirable gases (e.g., $CO_2$) into sorbent material at a first temperature. In the desorption mode, the adsorber is configured to desorb the undesirable gases (e.g., $CO_2$) from the sorbent material (e.g., regeneration of the sorbent material), for example, by heating the sorbent material from the first temperature to a higher second temperature using a heat source. The heat source may include a heated fluid, such as a heated gas and/or liquid (e.g., steam). In the following discussion, the heat source includes steam from the steam turbine system 14 and/or the HRSG 16 during normal operation and/or a shutdown operation of the combined cycle plant 10. In particular, the combined cycle system 10 continues a supply of the steam to complete the regeneration of the sorbent material during the shutdown operation, for example, by continuing a part load condition of the gas turbine system 12 to generate steam in the HRSG 16 for supporting the regeneration of the sorbent material of the carbon capture system 100. In the cooling mode, the adsorber is cooled in preparation for the next adsorption mode.

In certain embodiments, the carbon capture system 100 is a solvent-based carbon capture system, and the components 102, 104, 106, and/or 108 include one or more absorbers, strippers, and associated equipment. For example, the absorber is configured to absorb undesirable gases (e.g., $CO_2$) into a solvent, thereby outputting the treated gas 110 through an exhaust stack and a $CO_2$-rich solvent to the stripper. The stripper is configured to apply heat to the $CO_2$-rich solvent, thereby stripping the undesirable gases (e.g., $CO_2$) from the solvent to produce the captured gas 112 and a $CO_2$-lean solvent (e.g., regeneration of the solvent). The stripper may receive heat via a heat source, such as a heated gas and/or liquid (e.g., steam). The stripper returns the $CO_2$-lean solvent to the absorber to repeat the cycle. In the following discussion, the heat source includes steam from the steam turbine system 14 and/or the HRSG 16 during normal operation and/or a shutdown operation of the combined cycle plant 10. In particular, the combined cycle system 10 continues a supply of the steam to complete the regeneration of the solvent during the shutdown operation, for example, by continuing a part load condition of the gas turbine system 12 to generate steam in the HRSG 16 for supporting the regeneration of the solvent of the carbon capture system 100.

In the illustrated embodiment, the controller 22 is configured to control all aspects of the combined cycle system 10. The controller 22 includes one or more processors 120, memory 122, instructions 124 stored on the memory 122 and executable by the processor 120, and communication circuitry 126 configured to communicate with sensors and various equipment of the combined cycle system 10. For example, the controller 22 is configured to receive sensor feedback from sensors coupled to the gas turbine system 12, the steam turbine system 14, the HRSG 16, and the gas treatment system 18 (e.g., gas capture systems 20), and control the same equipment based on the sensor feedback, operating modes, user input, computer models, or any combination thereof. The sensors may include temperature sensors, pressure sensors, flow rate sensors, gas composition sensors, or any combination thereof. In certain embodiments, the controller 22 is configured to control operation of the gas capture systems 20 (e.g., carbon capture systems 100), such by controlling modes of operation (e.g., adsorption mode, desorption mode, and cooling mode), controlling heat sources for supplying heated fluid (e.g., steam) to the gas capture systems 20, controlling cooling sources for supply cooled fluids to the gas capture systems 20, or any combination thereof.

For example, the controller 22 may initiate shutdown operations (e.g., controlled shutdown operations) of the combined cycle system 10. During the shutdown operations, for example, the controller 22 may instruct the gas turbine system 12 to operate at a part load (e.g., 30, 40, 50, or 60 percent of full load) and output exhaust gas 62. The controller 22 may instruct shutdown of the steam turbine system 14 to isolate the HRSG 16. The controller 22 may instruct the HRSG 16 to generate steam 128 with the exhaust gas 62 and instruct a set of valves 130 to open to provide the steam 128 to the gas capture system 20 (e.g., carbon capture system 100) to support the desorption mode or regeneration of the separation materials (e.g., sorbent materials and/or solvents). The controller 22 may monitor the gas capture system 20 for completion of the desorption mode. The controller 22 may determine completion of the desorption mode based on a lapse of a period of time, a comparison between a concentration of undesirable gases within the separation material and a range of concentrations, or both. In response to completion, the controller 22 may instruct the set of valves 130 to close, the HRSG 16 to stop production of steam 128, the gas turbine system 12 to complete deloading, or any combination thereof. As such, the controller 22 may complete shutdown operations.

Figure 2:
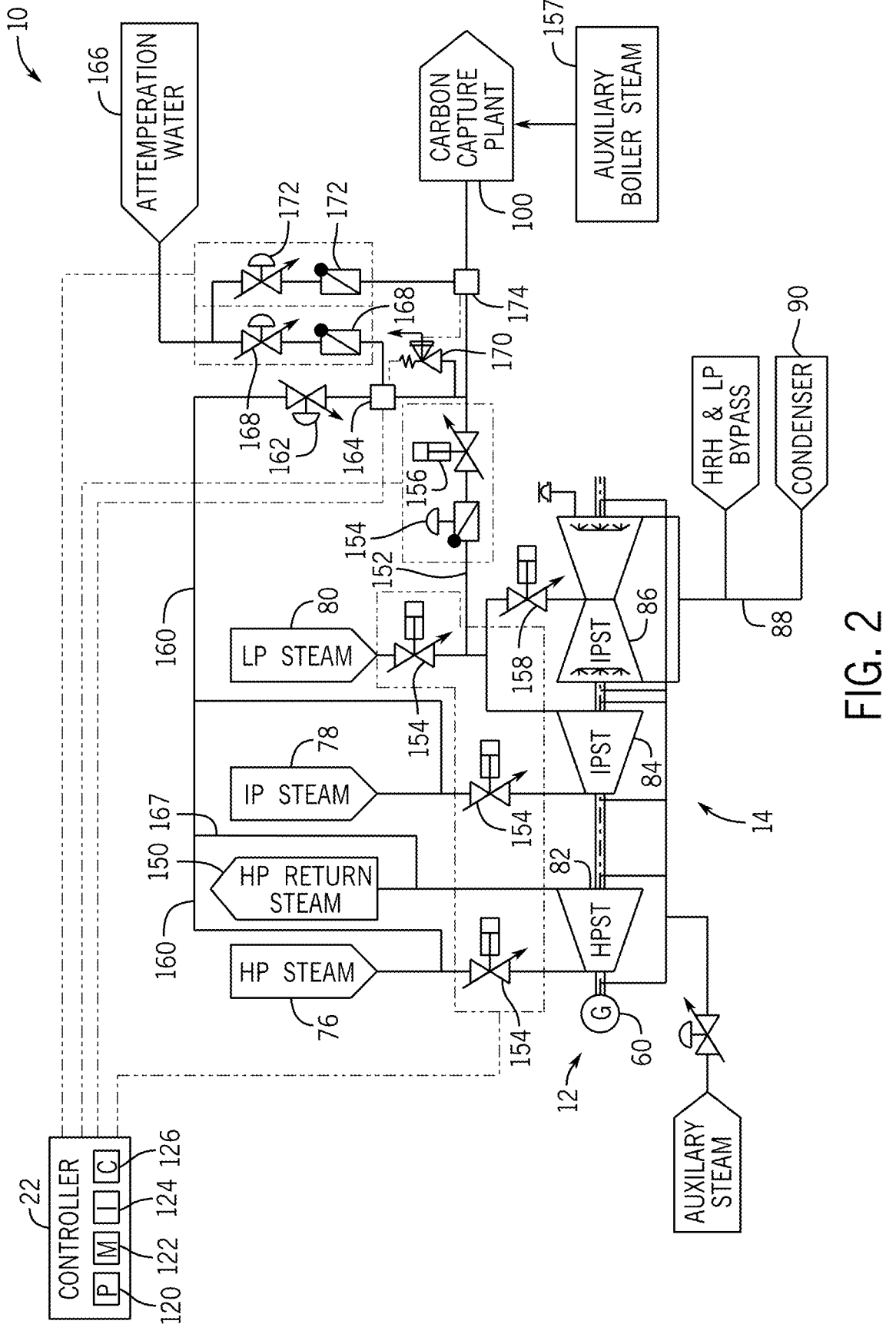
FIG. 2 is a schematic of an embodiment of the combined cycle system of FIG. 1, further illustrating a gas turbine, a heat recovery steam generator (HRSG), a carbon capture system, and a steam turbine.

FIG. 2 is a schematic of the combined cycle system 10 having a gas turbine system 12, a steam turbine system 14, a HRSG 16, a gas treatment system 18 having one or more carbon capture systems 100, and a controller 22 coupled to each of the systems 12, 14, 16, and 18. In certain instances, the carbon capture systems 100 may be coupled to an auxiliary boiler 157 that provides additional steam to the carbon capture systems 100. For example, the steam supply from the HRSG 16 may be less than a threshold steam supply, and the auxiliary boiler 157 may provide additional steam to facilitate the regeneration process of the carbon capture systems 100. In certain embodiments, the controller 22 is configured to control steam supplies from the HRSG 16 and the auxiliary boiler 157 to the carbon capture systems 100 to complete a regeneration process during a part load operation and/or a shutdown operation of the combined cycle system 10. Thus, the controller 22 may selectively enable, disable, increase flow, decrease flow, or any combination thereof, of any number of steam supplies to the carbon capture systems 100.

During combustion operations, the gas turbine system 12 may be outputting exhaust gas 62 and the gas capture systems 20 (e.g., carbon capture system 100) may be performing adsorption operations to enable gas capture of undesirable gases (e.g., $CO_2$) from the exhaust gas 62. The exhaust gas 62 may also be provided to the HRSG 16 for steam generation. The HRSG 16 may provide steam to drive the steam turbine system 14. For example, the HP steam section 70 of the HRSG 16 may provide HP steam 76 to the HP steam turbine 82 via an inlet of the HP steam turbine 82. The HP steam turbine 82 may provide HP return steam 150 via an outlet of the HP steam section 70, which directs HP return steam 150 back to the HRSG 16. The IP steam section 72 of the HRSG 16 may provide IP steam 78 to the IP steam turbine 84 via an inlet of the IP steam turbine 84. The LP steam section 74 may receive steam from the IP steam turbine 84 and the LP steam section 74 of the HRSG 16 via an inlet of the LP steam turbine 86. The LP steam turbine 86 then outputs any remaining steam/water to a condensate line 88 coupled to the LP steam section 74 of the HRSG 16. The condensate line 88 may include a condenser 90 configured to condense any remaining steam to form a condensate, and a pump 92 configured to pump the condensate back to the LP steam section 74. In certain instances, the steam turbine system 14 may provide heated water and/or steam to the carbon capture system 100 to support a desorption mode (e.g., regeneration operation) of the carbon capture system 100. Although the following discussion focuses on the carbon capture system 100, the illustrated embodiment is applicable to any type of gas capture system 20. As illustrated, for example, the LP steam turbine 86 may provide steam to the carbon capture system 100 via a main extraction line 152.

To facilitate movement of steam between the HRSG 16, the steam turbine system 14, and the carbon capture system 100, the controller 22 may adjust a position of one or more valves (e.g., actuator-driven valves) within the combined cycle system 10. For example, the controller 22 may instruct a first set of valves 154 disposed between the HRSG 16 and the steam turbine system 14 to open to provide the HP steam 76, the IP steam 78, and/or the LP steam 80 to the steam turbine system 14. In another example, the controller 22 may instruct a second set of valves 156 to open to provide the LP steam 80 to the carbon capture system 100. The controller 22 may instruct the first set of valves 154 to close when instructing the second set of valves 156 to open to provide the LP steam 80 to the main extraction line 152. Still in another example, the controller 22 may instruct a third valve 158 coupled to the LP steam turbine 86 to adjust positions based on a direction of steam. For example, the controller 22 may instruct the third valve 158 to open in a first direction to provide LP steam 80 or steam from the IP steam turbine 84 to the LP steam turbine 86 and open in a second direction to provide steam from the LP steam turbine 86 to the carbon capture system 100 via the main extraction line 152.

After a period of time, the controller 22 may initiate a controlled shutdown of the combined cycle system 10. The controlled shutdown may initiate a load reduction of the gas turbine system 12 from a first load condition (e.g., greater or full load condition) to a second load condition (e.g., lesser or part load condition), and also a shutdown of steam through the steam turbines (e.g., HP steam turbine 82, IP steam turbine 84, and LP steam turbine 86) via closure of main valves and opening of bypass valves. For example, the controller 22 may isolate the steam turbine system 14 from the HRSG 16 to shutdown the steam turbine system 14 by instructing closure of the first set of valves 154, the second set of valves 156, and the third valve 158. When the valves reach a minimum position (e.g., closed position), the steam turbine system 14 may be tripped and begin decelerating. In other instances, the controller 22 may instruct the steam turbine system 14 to decelerate based on instructing the valves to close.

During the controlled shutdown of the combined cycle system 10, the controller 22 may instruct the gas turbine system 12 to operate at a reduced load (e.g., a part load condition) for a prolonged duration of time, thereby causing the HRSG 16 to generate steam 128 for regeneration operations of the carbon capture system 100. In other words, rather than immediately continuing with the shutdown of the gas turbine system 12, the gas turbine system 12 will continue operating at the reduced load to continue steam generation in the HRSG 16 to support the regeneration operations. For example, during the controlled shutdown, the controller 22 may instruct the gas turbine system 12 to change from a full load condition (e.g., 100 percent power output) to a part load condition (e.g., less than or equal to 30, 40, 50, or 60 percent power output) to continue sending exhaust gas 62 to the HRSG 16 to generate the steam 128. For example, during the regeneration operations, the controller 22 may instruct the gas turbine system 12 to maintain the part load condition at a constant load and/or a gradually decreasing load while still enabling the HRSG 16 to generate the steam 128 sufficient for the regeneration operation. Still in another example, the controller 22 may instruct the gas turbine system 12 to maintain a minimum environmental load (MECL) to cause the HRSG 16 to generate the steam 128. The steam 128 may be residual steam generated while the gas turbine system 12 operates at the part load condition.

The steam generated by the HRSG 16 during the shutdown operations may be provided to the carbon capture system 100 via a backup line 160. For example, the backup line 160 may be positioned between the HRSG 16 and the steam turbine system 14. As illustrated, an inlet of the backup line 160 may be positioned between the HRSG 16 and the HP steam turbine 82 and the outlet of the backup line 160 may be positioned along the main extraction line 152. The backup line 160 may include another inlet positioned between the HRSG 16 and the IP steam turbine 84. To provide the steam 128, the controller 22 may instruct a fourth set of valves 161 on the backup line 160 to open. As such, the steam 128 (e.g., HP steam 76, IP steam 78) outputted by the HRSG 16 may be captured by the backup line 160 and provided to the carbon capture system 100.

The steam 128 may include a hot reheat steam and cold reheat steam. The hot reheat steam may include the steam 128 traversing from the outlet of the IP steam turbine 84 along the backup line 160 to the carbon capture plant 100. The cold reheat steam may include steam provided from the outlet of the HP steam return 150 along an additional backup line 167 to the backup line 160 and to the carbon capture plant 100. The hot reheat steam may be higher in temperature in comparison to the cold reheat steam.

The backup line 160 may include a fifth valve 162 that may open or close based on operation of the combined cycle system 10. For example, the controller 22 may instruct the fifth valve 162 to open during the shutdown operation to provide steam along the backup line 160 and close during the combustion operations.

The backup line 160 may also include a first attemperator 164 configured to attemperate or control a temperature of the steam 128. For example, the steam may travel along the backup line 160 in a temperature range of 300 to 500 degrees Celsius. To maintain the temperature of the steam 128 within a temperature range, the first attemperator 164 along the backup line 160 receives water from an attemperation water source 166 to adjust the temperature of the steam 128. For example, the attemperation water source 166 may adjust the temperature of the steam 128 based on a temperature control setpoint that may be determined based on the regeneration process. The attemperation water source 166 may inject water into the attemperator 164 along the backup line 160 to reduce the temperature of the steam 128 if the temperature of the steam 128 is greater than the temperature control setpoint.

The controller 22 may control operation of the attemperation water source 166 based on a temperature range. For example, the controller 22 may monitor the temperature of the steam 128 via one or more temperature sensors and instruct the sixth set of valves 168 to open or close based on a comparison between the temperature and a first temperature range. If the temperature of the steam 128 is outside of the first temperature range, then the controller 22 may instruct the sixth set of valves 168 to open to provide water from the attemperation water source 166 to the first attemperator 164 to adjust the temperature of the steam 128. If the temperature of the steam 128 is within the first temperature range, then the controller 22 may instruct the sixth set of valves 168 to close or remain closed. If the steam 128 exceeds an upper safety threshold (e.g., a maximum steam pressure and/or maximum steam temperature), then the controller 22 may instruct a safety valve 170 along the backup line 160 to open and release steam pressure for safety reasons. The safety valve 170 may include a pressure release valve.

The main extraction line 152 may include a second attemperator 174 configured to attemperate or control a temperature of the steam 128 along the main extraction line 152. For example, the steam 128 may travel along the backup line 160 in a temperature range of 200 to 300 degrees Celsius. The controller 22 may monitor the temperature via one or more sensors and compare the temperature of the steam 128 along the main extraction line 152 to a second temperature range. If the temperature of the steam 128 is outside of the second temperature range, then the controller 22 may instruct a seventh set of valves 172 to open to inject water into the second attemperator 174 along the main extraction line 152 to adjust the temperature of the steam 128. If the temperature of the steam 128 is within the second temperature range, then the controller 22 may instruct the seventh set of valves to close or remain closed. From the main extraction line 152, the steam 128 may be provided to the carbon capture system 100 for regeneration operations.

The carbon capture system 100 may perform regeneration operations using the steam 128. The regeneration operations may include desorbing the undesirable gases from a separation material (e.g., sorbent material of an adsorber, solvent of a stripper) by heating the separation materials. For example, the carbon capture system 100 may heat sorbent material from a first temperature to a higher second temperature using the steam 128 to remove the undesirable gases from the sorbent material. In another example, the carbon capture system 100 may apply heat to $CO_2$-rich solvent to strip undesirable gases from solvent to provide a $CO_2$-lean solvent. The HRSG 16 may provide the steam 128 to the carbon capture system 100 for any suitable period of time during the shutdown operations, for example, while the gas turbine system 12 operates in a part load condition and the steam turbine system 14 remains shutdown. The controller 22 may monitor the regeneration operations for completion. For example, the controller 22 may monitor a concentration of undesirable gases within the separation materials, an amount of time spent performing the regeneration operations, and so on. In response to determining completion of the regeneration operations, the controller 22 may continue shutdown operations to completion. For example, the controller 22 may instruct the fourth set of valves 161, the fifth valve 162, or both to close to stop providing steam 128 to the carbon capture system 100. In another example, the controller 22 may instruct the gas turbine system 12 to continue deloading and eventually shutdown completely. As such, the controller 22 may complete shutdown of the combined cycle system 10. By providing the steam 128 during shutdown operations, the regeneration of the separation materials may be complete to enable a subsequent startup operation to begin carbon capture operations more quickly and efficiently. As such, the carbon capture rate of the combined cycle system 10 may increase during the subsequent startup operation.

As discussed herein, the valves may include any suitable valves for providing heated water and/or steam between the steam turbine system 14, the HRSG 16, and the carbon capture system 100. For example, the valves may include check valves, bi-directional valves, ball valves, gate valves, butterfly valves, and so on. Each valve may be coupled to an actuator (e.g., electric actuator, pneumatic actuator, and/or hydraulic actuator) that controls a position of the valve. For example, the actuator may adjust a position of the valve between an open position and a closed position based on an indication from the controller 22.

FIG. 3 is a flowchart of an embodiment of a process 200 for shutting down the combined cycle system 10 of FIGS. 1 and 2. In the illustrated embodiment, the process 200 may be partially or entirely controlled by the controller 22 of FIGS. 1 and 2. The process 200 includes initiating a controlled shutdown of a plant 10 having a gas turbine system 12, a steam turbine system 14, a heat recovery steam generator (HRSG) 16, and a carbon capture system 100 (block 202). The process 200 also controls valves to direct steam from the HRSG 16 to the carbon capture system 100 for regeneration during the controlled shutdown (block 204). For example, the controller 22 may instruct a first set of valves 154, a second set of valves 156, and a third valve 158 to close to isolate the steam turbine system 14 from the HRSG 16. The controller 22 may also instruct a fourth set of valves 161 and a fifth valve 162 to open to provide the steam 128 to the carbon capture system 100. The process 200 then completes the controlled shutdown of the 10 plant after completion of the regeneration of the carbon capture system 100 (block 206). For example, the controller 22 may instruct the fourth set of valves 161 and the fifth valve 162 to close to stop providing the steam 128 to the carbon capture system 100, instruct the gas turbine system 12 to continue deloading and completely shutdown, or both. As such, the controller 22 may complete the controlled shutdown of the combined cycle system 10 after complete regeneration of the separation materials in the carbon capture system 100.

FIG. 4 is a flowchart of an embodiment of a process 240 for shutting down the combined cycle system 10 of FIGS. 1 and 2. In the illustrated embodiment, the process 240 may be partially or entirely controlled by the controller 22 of FIGS. 1 and 2. The process 240 includes initiate a controlled shutdown of a plant 10 having a gas turbine system 12, a steam turbine system 14, a heat recovery steam generator (HRSG) 16, and a carbon capture system 100 (block 242). The process 240 also controls the gas turbine system 12 to reduce to a part load condition (block 244). In certain instances, the gas turbine system 12 may operate in a full load condition. In other instances, the gas turbine system 12 may operate at a part load condition less than the full load condition, such as less than or equal to 30, 40, 50, or 60 percent of the full load condition. The process 240 then controls valves of the steam turbine system 14 to close to initiate a shutdown of the steam turbine system 14 (block 246). For example, the controller 22 may instruct the first set of valves 154 to close to isolate the steam turbine system 14 from the HRSG 16. The process 240 may also shutdown the steam turbine system 14 after closing the valves (block 248). The process 240 may control valves to direct steam from the HRSG 16 to supply steam to the carbon capture system 100 (block 250). For example, the controller 22 may instruct the valves to open to direct steam 128 from the HRSG 16 to the carbon capture system 100 via the backup line 160. The process 240 also controls the carbon capture system 100 to regenerate using the steam 128 from the HRSG 16 (block 252). For example, the controller 22 may instruct the carbon capture system 100 to operate in the desorption mode (e.g., perform regeneration operations) with the steam 128. The process 240 may monitor the carbon capture system 100 for completion of regeneration (block 254). For example, the controller 22 may determine completion based on lapse of a period of time, a concentration of undesirable gases within separation material, or both. The process 240 may then control valves to stop (e.g., close) steam 128 from the HRSG 16 to the carbon capture system 100 upon competition of regeneration (block 256). For example, the controller 22 may instruct the valves to close to stop directing steam from the HRSG 16 to the carbon capture system 100. The process 240 may also control the gas turbine system 12 to continue deloading to complete the controlled shutdown of the plant (block 258).

Technical effects of the disclosed embodiments provide steam during a shut-down process to improve gas capture by a sorbent-based gas capture (e.g., carbon capture of $CO_2$) system or a solvent-based gas capture system. During shutdown process, for example, a gas turbine may operate at a load (e.g., part load) and output exhaust gas, thereby causing the HRSG to continue outputting steam. The steam may be provided to the gas capture system via a backup line for regeneration processes. For example, the steam may strip out undesirable gases (e.g., $CO_2$) from a $CO_2$ rich solvent and increase total $CO_2$ captured at the gas capture system prior to complete shutdown. In another example, the steam may desorb the undesirable gases (e.g., $CO_2$) from the sorbent material, thereby regenerating the sorbent material. Providing steam to the gas capture system may increase an amount of $CO_2$ lean solvent and/or $CO_2$ lean sorbent material for carbon capture during a subsequent startup operation. As such, the disclosed embodiments provide increased $CO_2$ capture rates may during the next startup process due to leaner solvent and/or an increase amount of available sorbent material.

The subject matter described in detail above may be defined by one or more clauses, as set forth below.

A system including a gas capture system including a separation material, where the gas capture plant is configured to operate a regeneration process during a part load operation and/or a shutdown operation to desorb undesirable gas from the separation material to make it lean for an absorption process, a heat recovery steam generator (HSRG) configured to receive exhaust gas and generate steam, and a backup line fluidly coupling the gas capture system to the HRSG, where the backup line is configured to provide the steam from the HRSG to the gas capture system for the regeneration process during the part load operation and/or the shutdown operation.

The system of the preceding clause, including a gas turbine system configured to output the exhaust gas during the part load operation and/or the shutdown operation.

The system of any preceding clause, including an attemperator coupled to the backup line, wherein the attemperator is configured to control a temperature of the steam along the backup line, a pressure reduction valve to control the pressure of steam for the regeneration process, and a safety valve coupled to the backup line, wherein the safety valve is configured to release the steam if a steam pressure exceeds a pressure threshold.

The system of the preceding clause, including an attemperation water source configured to inject water into the attemperator along the backup line based on the temperature of the steam being greater than a temperature control setpoint for the regeneration process.

The system of any preceding clause, where the backup line is configured to provide the steam to a main extraction line fluidly coupled to the gas capture system.

The system of the preceding clause, where the main extraction line comprises an attemperator configured to control a temperature of the steam along the main extraction line.

The system of the preceding clause, including an attemperation water source configured to inject water into the attemperator along the main extraction line based on the temperature of the steam being greater than a temperature control setpoint for the regeneration process.

The system of any preceding clause, including a steam turbine fluidly coupled to the HRSG via a set of valves, and a controller communicatively coupled to the set of valves, wherein the controller is configured to control each valve of the set of valves to at least partially close based on receiving an indication to initiate the part load operation and/or the shutdown operation.

The system of the preceding clause, where the controller is configured to monitor the regeneration process of the gas capture system and the steam from the HRSG and start supplying steam from an additional steam provision source to support the regeneration process of the gas capture system based on the amount of the steam from the HRSG being less than a threshold steam supply.

The system of the preceding clause, where the additional steam provision source comprises an auxiliary boiler.

A system may include a plant including a gas turbine configured to output an exhaust gas, a heat recovery steam generator (HRSG) configured to receive the exhaust gas and output steam, and a steam turbine configured to receive the steam. The system may also include a carbon capture system configured to capture an undesirable gas from the exhaust gas in a separation material and a controller configured to initiate a part load operation and/or a shutdown operation of the plant. The controller may control the gas turbine to reduce to a part load condition and continue to output the exhaust gas, control a first set of valves to at least partially close to reduce or disable flow of the steam to the steam turbine, and control a second set of valves to enable or increase flow of the steam from the HRSG to the carbon capture system via a backup line for a period of time to perform a regeneration process on the separation material.

The system of the preceding clause, where the controller is configured to control the carbon capture system to perform the regeneration process using the steam from the HRSG.

The system of any preceding clause, where the controller is configured to control the second set of valves to close to stop the steam from the HRSG to the carbon capture system based on completion of the regeneration process or based on a change from the HRSG to an additional steam provision source for completion of the regeneration process.

The system of any preceding clause, where the controller is configured to control an additional steam provision source to start supplying the steam to support the regeneration process of the carbon capture system based the steam supply from the HRSG being less than a threshold steam supply.

The system of any preceding clause, including an attemperation water configured to inject water into an attemperator along the backup line based on a temperature of the steam along the backup line being greater than a temperature control setpoint for the regeneration process.

The system of any preceding clause, where the controller is configured to control the second set of valves to direct the steam from a high pressure (HP) steam section of the HRSG, an intermediate pressure (IP) steam section of the HRSG, or a combination thereof, to the carbon capture system during the regeneration process.

The system of any preceding clause, wherein the separation material comprises a sorbent material or a solvent.

A method may include initiating a shutdown operation or a part load operation of a plant having a gas turbine, a steam turbine, a heat recovery steam generator (HRSG), and a carbon capture system having a separation material, controlling the gas turbine to reduce to a part load condition, controlling a first set of valves to at least partially close to reduce or disable flow of a steam to the steam turbine, and controlling a second set of valves coupled to a backup line to enable or increase flow of the steam from the HRSG to the carbon capture system to perform a regeneration process on the separation material.

The method of the preceding clause, further including monitoring the carbon capture system during the regeneration process, controlling the second set of valves to stop directing the steam to the carbon capture system based on detection of the carbon capture system completing the regeneration process, and controlling the gas turbine to continue deloading to complete the shutdown operation of the plant.

The method of any preceding clause, further including controlling a steam supply of the steam from an additional steam provision source to support the regeneration process of the carbon capture system based on the steam supply of the steam from the HRSG being less than a threshold steam supply.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
  a gas capture system comprising a separation material, wherein the gas capture system is configured to operate a regeneration process during a part load operation and/or a shutdown operation to desorb undesirable gas from the separation material to regenerate the separation material for an absorption process;

a heat recovery steam generator (HSRG) configured to receive exhaust gas and generate steam; and
  a backup line fluidly coupling the gas capture system to the HRSG, wherein the backup line is configured to provide the steam from the HRSG to the gas capture system for the regeneration process during the part load operation and/or the shutdown operation, wherein the system further comprises:
    a first attemperator coupled to the backup line, a pressure reduction valve, and a safety valve coupled to the backup line, wherein the first attemperator is configured to control a temperature of the steam along the backup line, the pressure reduction valve is configured to control a pressure of steam for the regeneration process, and the safety valve is configured to release the steam if a steam pressure exceeds a pressure threshold; or
    a second attemperator coupled to a main extraction line, wherein the second attemperator is configured to control a temperature of the steam along the main extraction line, the backup line is configured to provide the steam to the main extraction line fluidly coupled to the gas capture system, and an attemperation water source is configured to inject water into the second attemperator along the main extraction line based on the temperature of the steam being greater than a temperature control setpoint for the regeneration process; or
    a steam turbine fluidly coupled to the HRSG via a set of valves and a controller communicatively coupled to the set of valves, wherein the controller is configured to control each valve of the set of valves to at least partially close based on receiving an indication to initiate the part load operation and/or the shutdown operation, wherein the controller is configured to monitor the regeneration process of the gas capture system and the steam from the HRSG, and start supplying steam from an additional steam provision source to support the regeneration process of the gas capture system based on an amount of the steam from the HRSG being less than a threshold steam supply; or
    any combination thereof.

2. The system of claim 1, comprising a gas turbine system configured to output the exhaust gas during the part load operation and/or the shutdown operation.

3. The system of claim 1, comprising:
  the first attemperator coupled to the backup line, wherein the attemperator is configured to control the temperature of the steam along the backup line;
  the pressure reduction valve to control the pressure of steam for the regeneration process; and
  the safety valve coupled to the backup line, wherein the safety valve is configured to release the steam if the steam pressure exceeds the pressure threshold.

4. The system of claim 3, comprising the attemperation water source configured to inject water into the first attemperator along the backup line based on the temperature of the steam being greater than another temperature control setpoint for the regeneration process.

5. The system of claim 1, wherein the backup line is configured to provide the steam to the main extraction line fluidly coupled to the gas capture system.

6. The system of claim 5, wherein the main extraction line comprises the second attemperator configured to control the temperature of the steam along the main extraction line.

7. The system of claim 6, comprising the attemperation water source configured to inject water into the attemperator along the main extraction line based on the temperature of the steam being greater than the temperature control setpoint for the regeneration process.

8. The system of claim 1, comprising:

the steam turbine fluidly coupled to the HRSG via the set of valves; and the controller communicatively coupled to the set of valves, wherein the controller is configured to control each valve of the set of valves to at least partially close based on receiving the indication to initiate the part load operation and/or the shutdown operation.

9. The system of claim 8, wherein the controller is configured to:

monitor the regeneration process of the gas capture system and the steam from the HRSG; and start supplying steam from the additional steam provision source to support the regeneration process of the gas capture system based on the amount of the steam from the HRSG being less than the threshold steam supply.

10. The system of claim 9, wherein the additional steam provision source comprises an auxiliary boiler.

11. A system, comprising:

a plant comprising:

a gas turbine configured to output an exhaust gas;

a heat recovery steam generator (HRSG) configured to receive the exhaust gas and output steam;

a steam turbine configured to receive the steam; and a carbon capture system configured to capture an undesirable gas from the exhaust gas in a separation material; and a controller configured to initiate a part load operation and/or a shutdown operation of the plant by:

controlling the gas turbine to reduce to a part load condition and continue to output the exhaust gas;

controlling a first set of valves to at least partially close to reduce or disable flow of the steam to the steam turbine; and controlling a second set of valves to enable or increase flow of the steam from the HRSG to the carbon capture system via a backup line for a period of time to perform a regeneration process on the separation material.

12. The system of claim 11, wherein the controller is configured to:

control the carbon capture system to perform the regeneration process using the steam from the HRSG; and monitor the regeneration process of the carbon capture system over the period of time.

13. The system of claim 12, wherein the controller is configured to control the second set of valves to close to stop the steam from the HRSG to the carbon capture system based on completion of the regeneration process or based on a change from the HRSG to an additional steam provision source for completion of the regeneration process.

14. The system of claim 12, wherein the controller is configured to control an additional steam provision source to start supplying the steam to support the regeneration process of the carbon capture system based on a steam supply of the steam from the HRSG being less than a threshold steam supply.

15. The system of claim 11, comprising an attemperation water configured to inject water into an attemperator along the backup line based on a temperature of the steam along the backup line being greater than a temperature control setpoint for the regeneration process.

16. The system of claim 11, wherein the controller is configured to control the second set of valves to direct the steam from a high pressure (HP) steam section of the HRSG, an intermediate pressure (IP) steam section of the HRSG, or a combination thereof, to the carbon capture system during the regeneration process.

17. The system of claim 11, wherein the separation material comprises a sorbent material or a solvent.

18. A method, comprising:

initiating a shutdown operation or a part load operation of a plant having a gas turbine, a steam turbine, a heat recovery steam generator (HRSG), and a carbon capture system having a separation material;

controlling the gas turbine to reduce to a part load condition;

controlling a first set of valves to at least partially close to reduce or disable flow of a steam to the steam turbine; and controlling a second set of valves coupled to a backup line to enable or increase flow of the steam from the HRSG to the carbon capture system to perform a regeneration process on the separation material.

19. The method of claim 18, further comprising:

monitoring the carbon capture system during the regeneration process;

controlling the second set of valves to stop directing the steam to the carbon capture system based on detection of the carbon capture system completing the regeneration process; and controlling the gas turbine to continue deloading to complete the shutdown operation of the plant.

20. The method of claim 18, further comprising controlling a steam supply of the steam from an additional steam provision source to support the regeneration process of the carbon capture system based on the steam supply of the steam from the HRSG being less than a threshold steam supply.

21. The system of claim 1, wherein the system comprises both:

the first attemperator coupled to the backup line, the pressure reduction valve, and the safety valve coupled to the backup line, wherein the first attemperator is configured to control the temperature of the steam along the backup line, the pressure reduction valve is configured to control the pressure of steam for the regeneration process, and the safety valve is configured to release the steam if the steam pressure exceeds the pressure threshold; and the second attemperator coupled to the main extraction line, wherein the second attemperator is configured to control the temperature of the steam along the main extraction line, the backup line is configured to provide the steam to the main extraction line fluidly coupled to the gas capture system, and the attemperation water source is configured to inject water into the second attemperator along the main extraction line based on the temperature of the steam being greater than the temperature control setpoint for the regeneration process.

22. The system of claim 21, further comprising:

the steam turbine fluidly coupled to the HRSG via the set of valves and the controller communicatively coupled to the set of valves, wherein the controller is configured to control each valve of the set of valves to at least partially close based on receiving the indication to initiate the part load operation and/or the shutdown operation, wherein the controller is configured to monitor the regeneration process of the gas capture system and the steam from the HRSG, and start supplying steam from the additional steam provision source to support the regeneration process of the gas capture system based on the amount of the steam from the HRSG being less than the threshold steam supply.

*    *    *    *    *